(12) United States Patent
Rieger et al.

(10) Patent No.: US 7,299,842 B2
(45) Date of Patent: Nov. 27, 2007

(54) LINK MEMBER FOR TIRE CHAINS

(75) Inventors: Hansjörg Rieger, Aalen (DE); Zvonimir Bogdan, Abtsgmünd (DE)

(73) Assignee: Eisen- und Drahtwerk Erlau AG, Aalen (DE)

( * ) Notice: Subject to any disclaimer, the term of this patent is extended or adjusted under 35 U.S.C. 154(b) by 147 days.

(21) Appl. No.: 10/907,193

(22) Filed: Mar. 24, 2005

(65) Prior Publication Data

US 2005/0211356 A1   Sep. 29, 2005

(30) Foreign Application Priority Data

Mar. 29, 2004   (DE)   ................. 20 2004 005 335 U (51) Int. Cl.
 *B60C 27/20* (2006.01)
(52) U.S. Cl. ...................... 152/243; 152/231
(58) Field of Classification Search ................. 152/170, 152/171, 185, 231, 243, 244
See application file for complete search history.

(56) References Cited

U.S. PATENT DOCUMENTS

| 3,709,275 | A | * | 1/1973 | Muller | ........................ | 152/243 |
|---|---|---|---|---|---|---|
| 3,714,975 | A | * | 2/1973 | Muller | ........................ | 152/243 |
| 3,799,232 | A | * | 3/1974 | Schnurle | ...................... | 152/231 |
| 4,928,740 | A | * | 5/1990 | Konig | ........................... | 152/243 |
| 4,947,912 | A | * | 8/1990 | Weidler | ....................... | 152/243 |
| 5,058,645 | A | * | 10/1991 | Muller | ........................ | 152/244 |
| 5,072,763 | A | * | 12/1991 | Muller et al. | ............... | 152/243 |
| 6,039,100 | A | * | 3/2000 | Muller | ........................ | 152/243 |
| 6,520,231 | B1 | * | 2/2003 | Dohmeier | .................... | 152/231 |

* cited by examiner

*Primary Examiner*—Russell D. Stormer
*Assistant Examiner*—Kip Kotter
(74) *Attorney, Agent, or Firm*—Gudrun E. Huckett (57) ABSTRACT

A link member for tire chains has a link member body having at least one connecting opening for receiving additional chain members. The link member body has a tire contact part and a wear part, wherein the wear part has lateral studs and at least one central stud. The lateral studs are positioned on opposed sides of the at least one central stud. The at least one central stud projects past the lateral studs in a first and a second transverse directions extending transversely to a longitudinal center plane of the link member body such that the wear part, when viewed in a plan view, is approximately cruciform.

24 Claims, 9 Drawing Sheets

LINK MEMBER FOR TIRE CHAINS

BACKGROUND OF THE INVENTION

The invention relates to a link member for tire chains, in particular tire protection chains, comprising a link member body that has at least one connecting opening for additional chain members and comprises a tire contact part and a wear part having lateral studs and at least one central stud.

Link members are known in which the wear part comprises several essentially identically configured studs between which recesses are provided. The lateral surfaces and the end faces of the link member body extend essentially parallel to one another.

SUMMARY OF THE INVENTION

It is an object of the present invention to configure a link member of the aforementioned kind such that, while a constructively simple configuration is provided, a high wear volume as well as excellent traction are ensured even after an extended service life.

In accordance with the present invention, this is achieved in that the central stud projects laterally past the lateral studs such that the wear part is approximately cross-shaped (cruciform) in a plan view.

As a result of the configuration according to the invention, the link member is supported on the ground on four locations that are positioned relative to one another in a cross shape (cruciform); excellent grip and traction are ensured in this way. Moreover, the link member according to the invention has a high wear volume. Advantageously, by means of a substantially rectangular configuration of the connecting openings it is ensured that the linked connecting members can move properly within the link member so that canting is reliably prevented. By providing lateral depressions in the area of the wear part, it is achieved that, after a certain wear has taken place, new profiled edges are formed in the area of the depressions that improve the traction and wear volume again. By arranging additional projections in the area of the wear part, the wear volume can be further increased and traction can be improved.

DESCRIPTION OF THE PREFERRED EMBODIMENTS

The link member 1 according to FIGS. 1 through 9 is designed for tire protection chains which are comprised of link members and ring members (not illustrated). The link member 1 has a flat link member body 2 with two connecting openings 3, 4 for the ring members of the tire protection chain. The openings 3, 4 are positioned sequentially in the longitudinal direction of the link member 1 at a spacing to one another.

Figure 2:
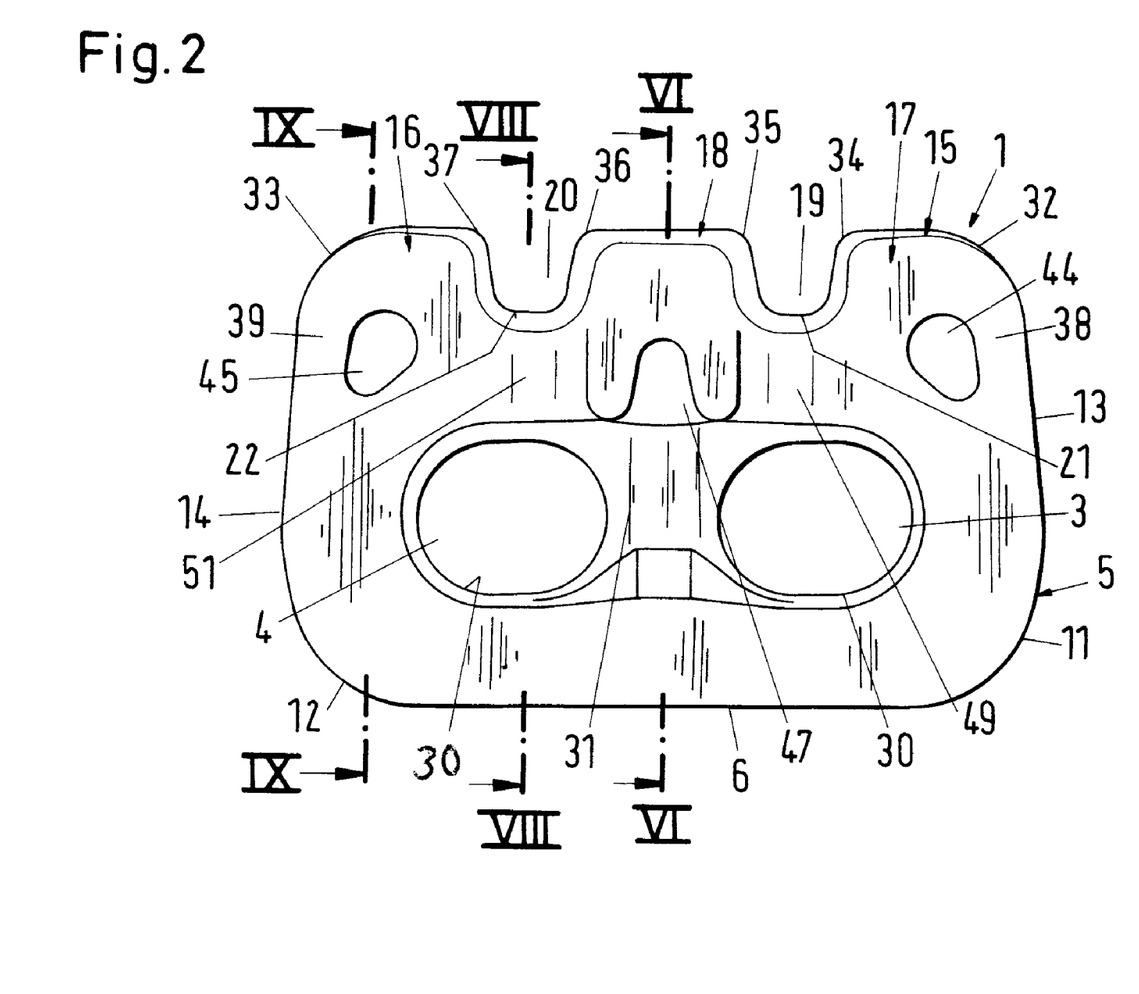
FIG. 2 shows the link member according to FIG. 1 in a side view.

The connecting openings 3, 4 have a substantially oval contour as shown in FIG. 2. This configuration has the advantage that no additional tensile forces are generated when the link member tilts. The edges of the connecting openings are advantageously rounded in order to prevent hooking or catching of the connecting members or ring members on one another.

The link member 1 has a tire contact part 5 for contacting the tire; the tire contact part 5 delimits the connecting openings 3, 4 in the downward direction (FIG. 2). The tire contact part 5 has a somewhat crowned tire contact surface 6 (FIG. 6) with which the link members during use of the tire chain stand on the corresponding tire. The tire contact surface 6 passes across the rounded longitudinal edges 7, 8 into lateral walls 9, 10 of the link member body 2, i.e., its tire contact part 5. This configuration of the tire contact part 5 ensures that the link member can easily roll on the tire without damaging the tire. The lateral walls 9, 10 diverge from the tire contact surface 6 in a direction toward the wear part 15. The tire contact surface 6 passes across part-circular rounded corners 11, 12 into the end faces 13, 14 of the link member body 2. As shown in FIG. 2, the end faces 13, 14 converge in the direction toward the wear part 15.

Figure 8:
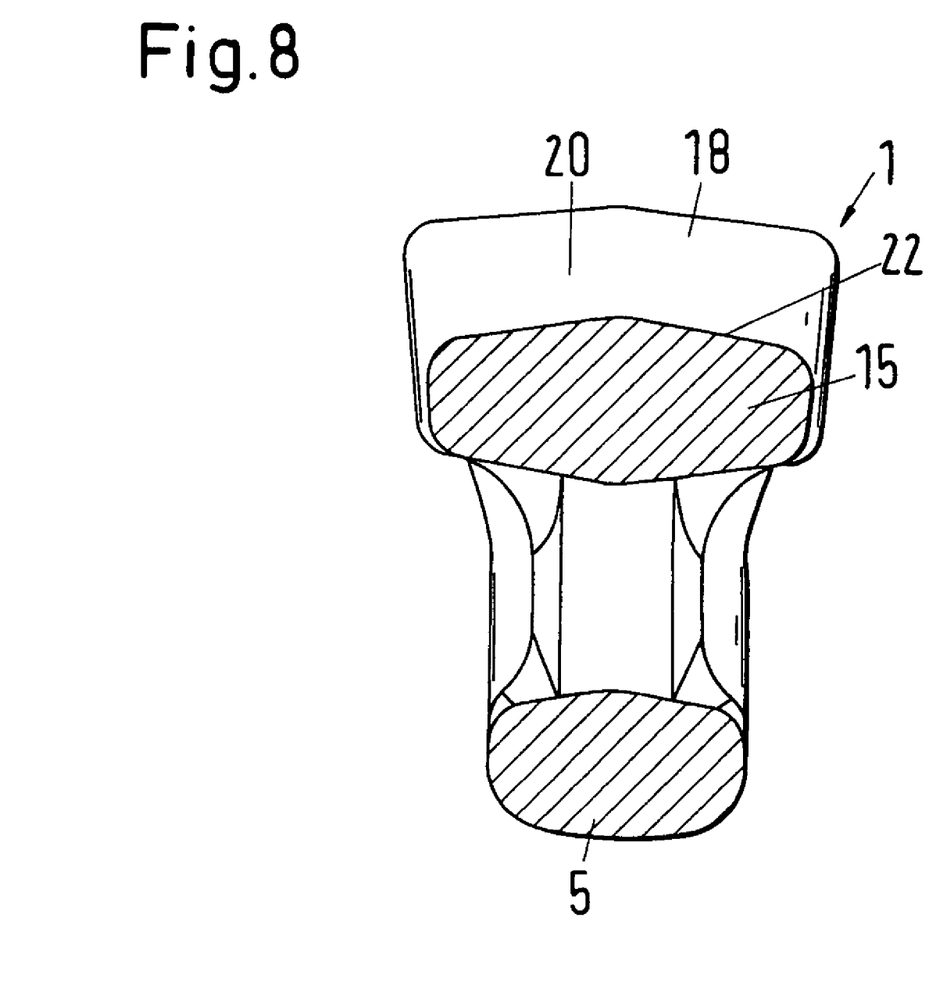
FIG. 8 is a section view along section line VIII-VIII of FIG. 2.
Figure 9:
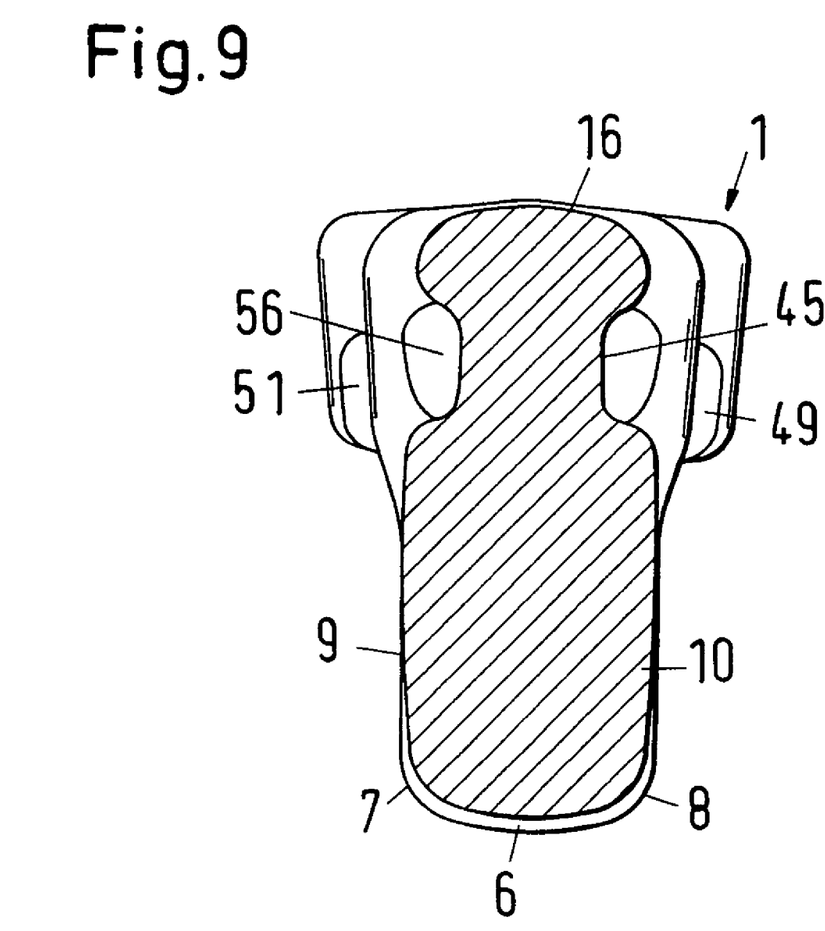
FIG. 9 is a section view along section line IX-IX of FIG. 2.

The section of the link member body 2 above the connecting openings 3, 4 forms the wear part 15 of the link member 1. In the illustrated embodiment, the wear part 15 has three studs 16 to 18 that are positioned at a spacing from one another in the longitudinal direction of the link member. Between the lateral studs 16, 17 and the central stud 18 there is a recess 19, 20, respectively. The recesses 19, 20 each have a rounded bottom 21, 22 when viewed in a side view according to FIG. 2. In the transverse direction of the link member body 2, the bottom 21, 22 has a pitched roof shape as illustrated in FIG. 8 for bottom 22. The bottom sections rise starting at the lateral walls 9, 10, respectively, and pass into one another at half the thickness of the link member body 2 at an obtuse angle. The facing sidewalls 23 and 24; 25 and 26 of the neighboring studs 17, 18 and 18, 16 are also pitched roof shaped (see FIG. 3). The pitched roof shaped sidewalls that laterally delimit the recesses 19, 20 thus project in the direction toward the neighboring stud 16 to 18, respectively. The sidewall sections pass at an obtuse angle into one another at half the thickness of the link member body 2. The link member body 2 is mirror symmetrical to its longitudinal center plane and its transverse center plane.

Figure 1:
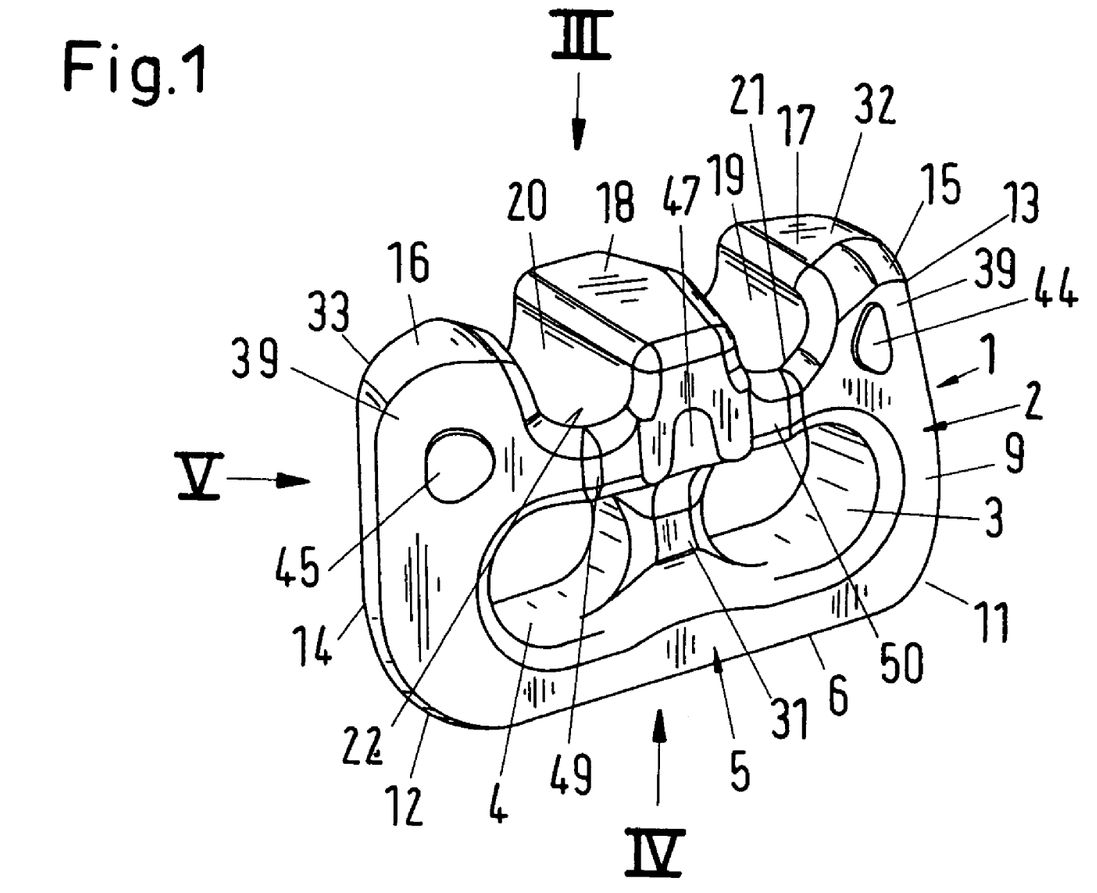
FIG. 1 shows the link member according to the invention in a perspective illustration.

The connecting openings 3, 4 are separated from one another by a central stay 31 (FIGS. 1, 6, and 8) that connects the tire contact part 5 and the wear part 15 at the level of the central stud 18. The sidewalls 27, 28 (FIG. 6) of the central stay 31 have a rounded transition into the sidewalls 30, 30 of the connecting openings 3, 4 (FIGS. 1, 2 and 8).

In this way, it is ensured to that the connected chain members can move properly within the connecting openings 3, 4 in order to prevent canting of the link member 1 within the ground.

The end faces 13, 14 of the link member body 2 pass across rounded areas 32, 33 (FIG. 2) into the wear side of the link member 1 provided at the topside of the studs 16 to 18. The wear side passes across rounded transition sections 34 through 37 of the studs 16 to 18 into the sidewalls 23 to 26 of the studs 16 to 18 within the recesses 19, 20 (FIGS. 2 and 3).

Figure 3:
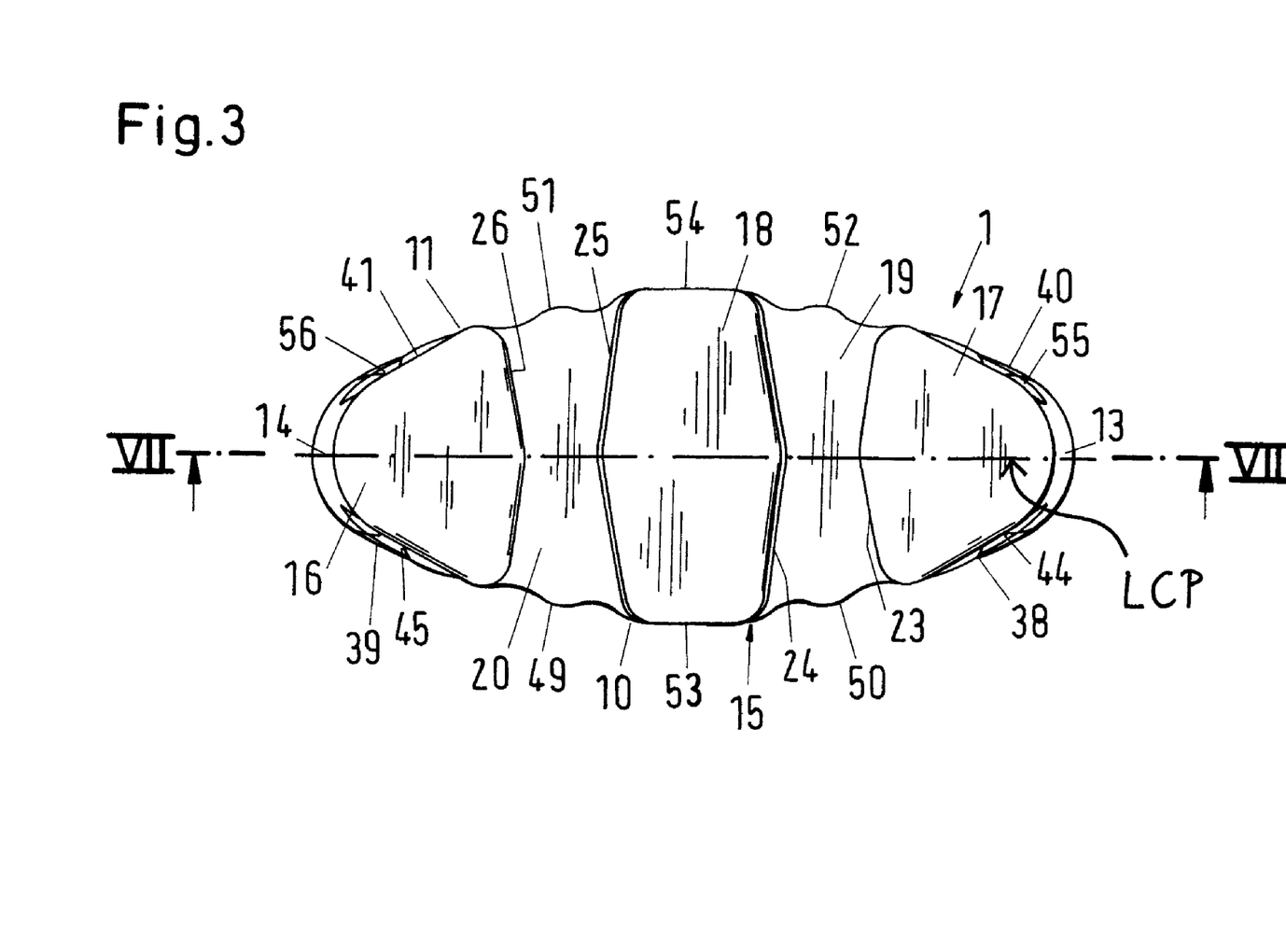
FIG. 3 is a plan view onto the link member according to FIG. 1 in the direction of arrow III of FIG. 1.
Figure 4:
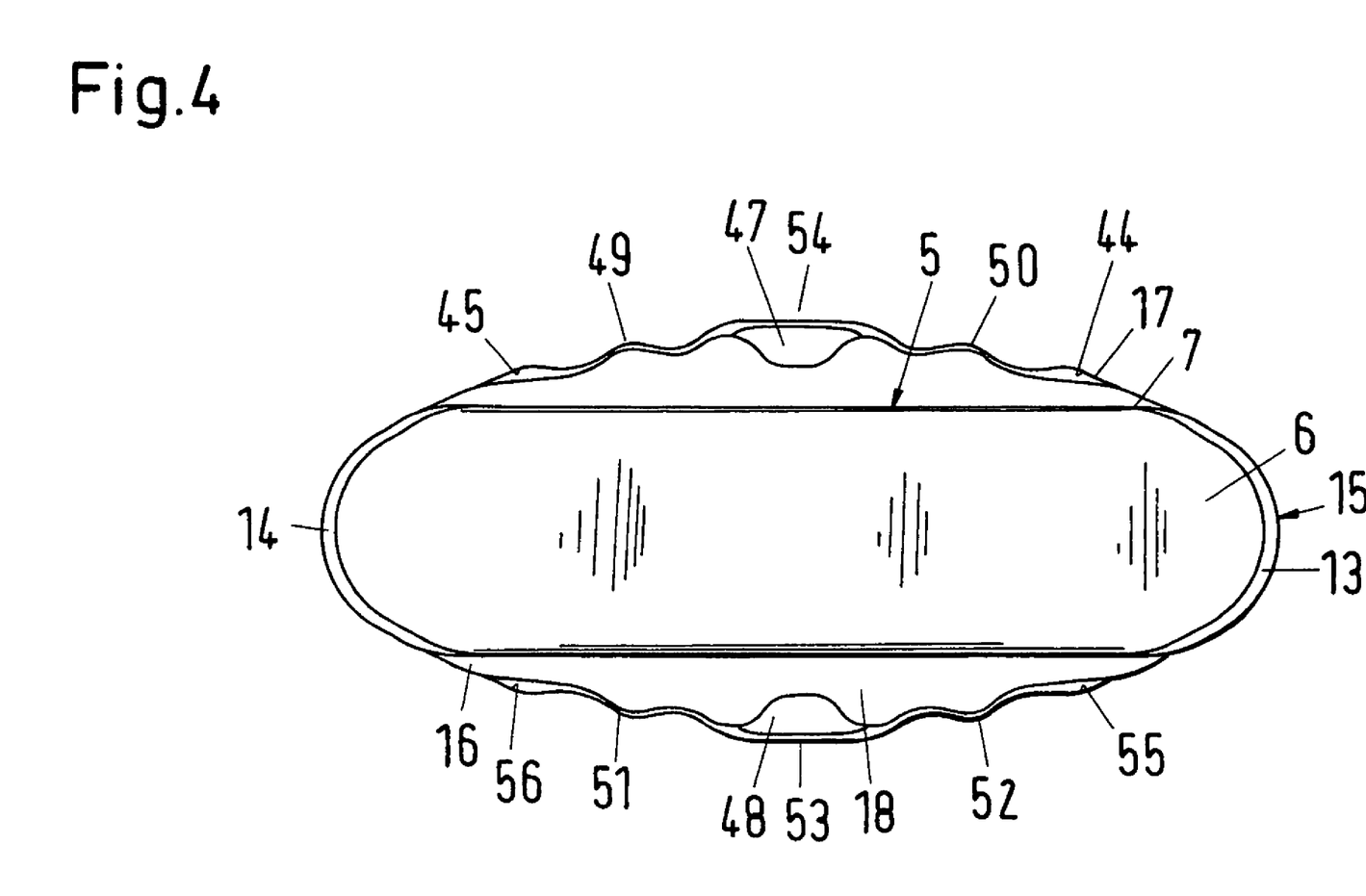
FIG. 4 is a bottom view of the link member according to FIG. 1 in the direction of arrow IV of FIG. 1.
Figure 5:
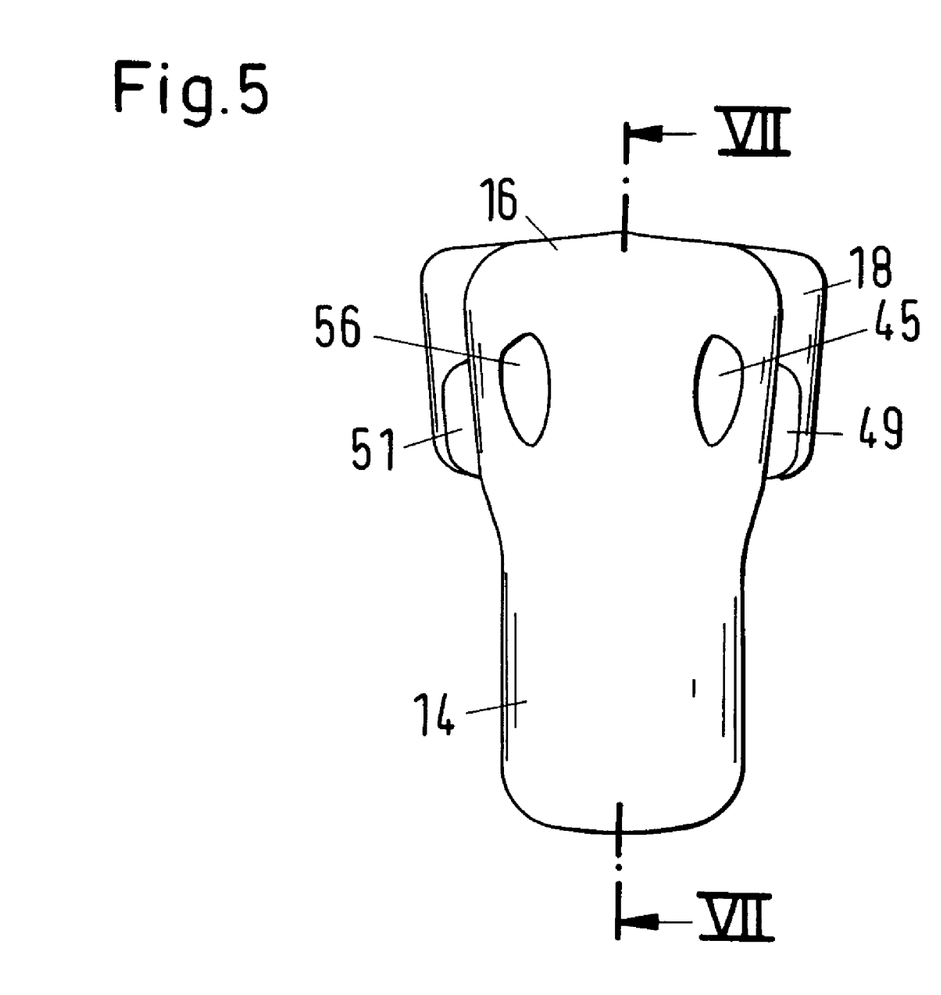
FIG. 5 shows the link member according to FIG. 1 in a side view in the direction of arrow V of FIG. 1.
Figure 6:
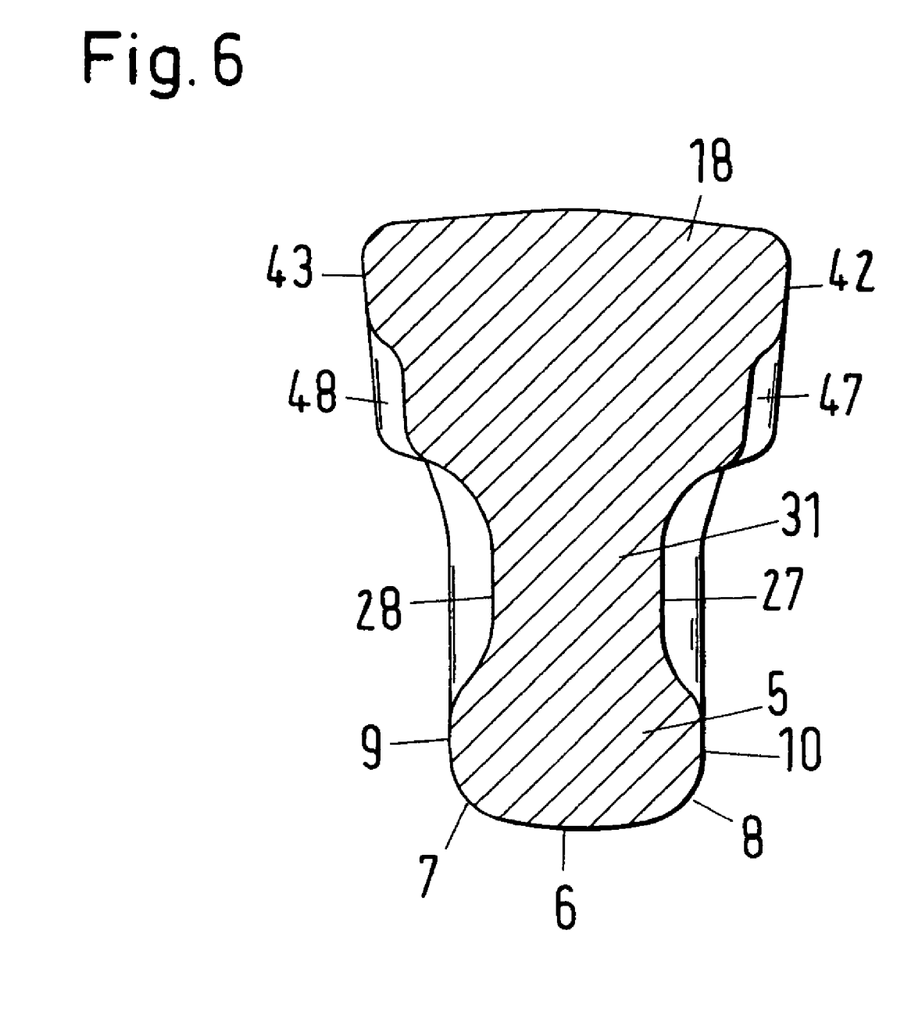
FIG. 6 is a section view along section line VI-VI of FIG. 2.
Figure 7:
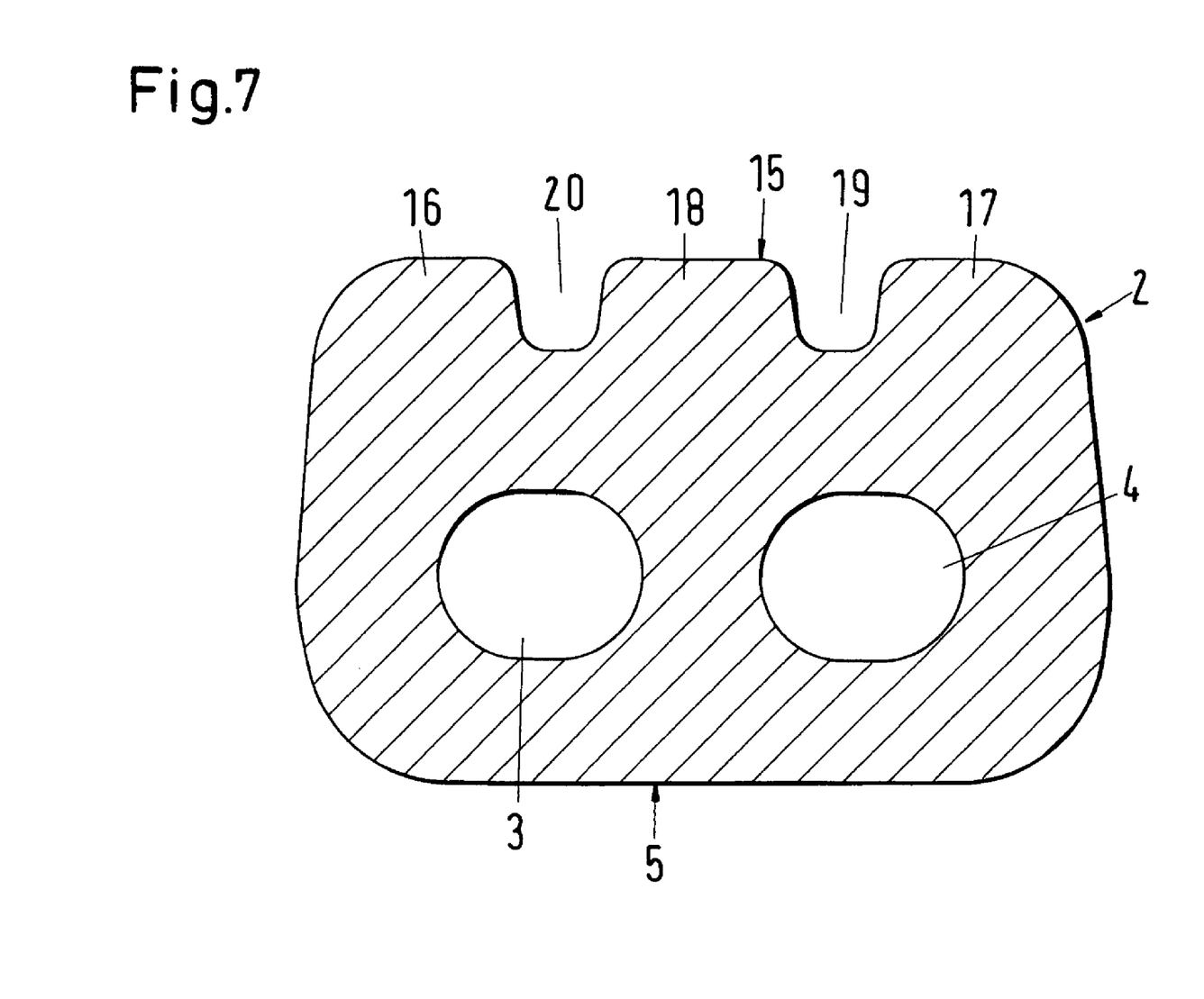
FIG. 7 is a section view along section line VII-VII of FIG. 3.

In a plan view according to FIG. 3, the wear part 15 has an elliptical contour. The central stud 18 projects laterally (transversely to the longitudinal center plane LCP of the link member body 2) past the two identically configured studs 16, 17 so that the wear part 15 is approximately cruciform. In this way, a relatively great division of the link member 1 results so that the corresponding mesh of the tire chain of this four-point configuration becomes larger and a high gripping action and traction are achieved. The central stud 18 has in a plan view approximately a shape consisting of two trapezoids that rest with their base against one another (FIG. 3) and taper in a transverse direction away from the longitudinal center plane LCP of the link member body 2 to both sides. The two lateral studs 16, 17 have sidewalls that extend at an acute angle relative to one another and have a rounded transition into one another through the end faces 13 and 14 of the link member body 2. The lateral studs 16, 17 widen continuously, starting at the end faces 13, 14, toward the pitched roof shaped side walls 23 and 26 that face one another.

In order to ensure a high grip of the link member 1 even as wear increases, on the lateral surfaces 38 to 41 of the lateral studs 16 and 17 and on the lateral surfaces 42, 43 (FIG. 6) of the central stud 18 depressions 44, 45, 47, 48, 55, 56 are provided, respectively. The depth of these depressions corresponds advantageously approximately to the maximum wear volume of the studs 16 to 18 so that they can be used to a maximum extent. In this way, the link member 1, despite having the depressions 44, 45, 47, 48, 55, 56, has a relatively large wear volume. The lateral depressions 44, 45, 47, 48, 55, 56 are employed when the studs 16 to 18 are worn to the level of the depressions. As soon as the depressions become effective, new corners and edges are formed in the area of the depressions, and this leads to a great increase of grip.

While the depressions 44, 45, 55, 56 provided on the lateral studs 16, 17 have a closed circumferential contour, the depressions 47, 48 provided on the central stud 18 are open in a direction facing the tire contact side 6. These depressions 47, 48 have in a plan view a substantially U-shaped contour.

In order to further increase traction of the link member 1 with increasing wear, in the area between the depressions 44, 45, 47, 48, 55, 56 underneath the recesses 19, 20 projections 49, 50 and 51, 52 are provided, respectively, which project past the lateral walls 9, 10 of the link member body 2 and extend essentially across the entire distance between the connecting openings 3, 4 and the recesses 19, 20. The projections 49 to 52 project approximately into the plane of the lateral surfaces 53, 54 of the central stud 18. In this way, the projections 49 to 52 provide upon wear of the studs additional corners and edges that further increase the wear volume and the grip of the link member.

In order for the engaging edges of the link member 1 to be relatively sharp even upon tilting, the lateral walls 9,10 of the link member body 2 extend from the end faces 13 or 14 in the direction toward the center of the link member at an acute angle (FIG. 3), preferably at an angle of approximately 45 degrees.

The link member 1 described in connection with FIGS. 1 through 9 has a relatively high wear volume that is achieved by a relatively tall and wide wear part 15 provided with the studs 16 to 18. The design and the rounded shape of the corners of the link member body 2 ensure proper rolling and prevent canting of the link member. The shape of the connecting openings 3, 4 ensures proper movability of the connecting members without causing additional tensile forces to act on them. When the studs 16 to 18 wear down and the grip decreases accordingly, the depressions 44 to 48, 55, 56 and the projections 49 to 52 become effective. When the studs 16 to 18 are worn down to the area of the depressions and projections, new corners and edges are formed so that grip and also traction of the tire chain is greatly increased. The design of the lateral walls 9, 10 of the link member body 2 provides additional grip of the link member 1. As a result of its high wear volume and its great grip, the link member 1 can therefore ensure even at relatively high wear the required gripping action and traction. Accordingly, the link member 1 is suitable for a plurality of different tire chains that are provided for different applications.

While specific embodiments of the invention have been shown and described in detail to illustrate the inventive principles, it will be understood that the invention may be embodied otherwise without departing from such principles.

What is claimed is:

1. A link member for tire chains, the link member comprising:
   a link member body having at least one connecting opening for receiving additional chain members;
   the link member body comprising a tire contact part and a wear part, wherein the wear part has lateral studs and at least one central stud and wherein the lateral studs are positioned on opposed sides of the at least one central stud;
   wherein the at least one central stud projects past the lateral studs in a first and a second transverse directions extending transversely to a longitudinal center plane of the link member body;
   wherein at least on the wear part the lateral walls of the link member body have at least one depression;
   wherein the at least one depression has a closed contour in an upward direction toward a wear side of the at least one central stud and the lateral studs.

2. The link member according to claim 1, wherein the at least one central stud tapers at least in the first transverse direction.

3. The link member according to claim 2, wherein the at least one central stud, when viewed in a plan view, has a shape consisting of two trapezoids each having a base and resting with the bases against one another, wherein the trapezoids taper in a transverse direction away from the longitudinal center plane of the link member body.

4. The link member according to claim 1, wherein the lateral studs widen, beginning at opposed end faces of the link member body, in a direction toward the at least one central stud, respectively.

5. The link member according to claim 4, wherein the link member body has lateral walls thatconverge at an acute angle toward the opposed end faces of the link member body.

6. The link member according to claim 5, wherein the acute angle of the lateral walls of the link member body is approximately 45 degrees.

7. The link member according to claim 1, wherein the lateral studs each have a sidewall facing the at least one central stud, wherein the sidewalls of the lateral studs have sidewall sections positioned at an obtuse angle relative to one another so that the sidewalls have a pitched roof shape.

8. The link member according to claim 1, wherein the at least one central stud has sidewalls facing the sidewalls of the lateral studs, respectively, wherein between the sidewalls of the at least one central stud and the sidewalls of the lateral studs recesses are formed that widen continuously in the first and second transverse directions relative to the longitudinal center plane.

9. The link member according to claim 1, wherein the lateral walls each have one of the at least one depression at least on one of the lateral studs and at least one central stud.

10. The link member according to claim 1, wherein the at least one depression provided on the lateral studs has a closed contour.

11. The link member according to claim 1, wherein the at least one depression provided on the lateral studs tapers in a direction toward end faces of the link member body.

12. The link member according to claim 1, wherein the at least one connecting opening has a substantially oval contour.

13. The link member according to claim 12, wherein the at least one connecting opening has rounded edges.

14. A link member for tire chains, the link member comprising:
    a link member body having at least one connecting opening for receiving additional chain members;
    the link member body comprising a tire contact part and a wear part, wherein the wear part has lateral studs and at least one central stud and wherein the lateral studs are positioned on opposed sides of the at least one central stud;
    wherein the at least one central stud projects past the lateral studs in a first and a second transverse directions extending transversely to a longitudinal center plane of the link member body;
    wherein at least on the wear part the lateral walls of the link member body have at least one depression;
    wherein the at least one depression provided on the at least one central stud is open in a downward direction toward the tire contact part.

15. The link member according to claim 14, wherein the at least one depression provided on the at least one central stud has a substantially U-shaped contour.

16. The link member according to claim 14, wherein the at least one central stud tapers at least in the first transverse direction.

17. The link member according to claim 16, wherein the at least one central stud, when viewed in a plan view, has substantially a trapezoidal shape relative to the longitudinal center plane of the link member body.

18. The link member according to claim 14, wherein the lateral studs widen, beginning at opposed end faces of the link member body, in a direction toward the at least one central stud, respectively.

19. The link member according to claim 18, wherein the link member body has lateral walls that converge at an acute angle toward the opposed end faces of the link member body.

20. The link member according to claim 19, wherein the acute angle of the lateral walls of the link member body is approximately 45 degrees.

21. The link member according to claim 14, wherein the lateral studs each have a sidewall facing the at least one central stud, wherein the sidewalls of the lateral studs have sidewall sections posiUoned at an obtuse angle relative to one another so that the sidewalls have a pitched roof shape, wherein the at least one central stud has sidewalls facing the sidewalls of the lateral studs, respectively, wherein between the sidewalls of the at least one central stud and the sidewalls of the lateral studs recesses are formed that widen continuously in the first and second transverse directions relative to the longitudinal center plane.

22. A link member for tire chains, the link member comprising:
    a link member body having at least one connecting opening for receiving additional chain members;
    the link member body comprising a tire contact part and a wear part, wherein the wear part has lateral studs and at least one central stud and wherein the lateral studs are positioned on opposed sides of the at least one central stud;
    wherein the at least one central stud projects past the lateral studs in a first and a second transverse directions extending transversely to a longitudinal center plane of the link member body;
    wherein the link member has lateral walls and the lateral walls each have at least two projections spaced at a distance from one another, respectively;
    wherein the projections are positioned adjacent to the at least one central stud;
    wherein between the at least one central stud and the lateral studs recesses are formed and wherein two of the at least one connecting opening are provided, wherein the projections are positioned between the connecting openings and the recesses.

23. The link member according to claim 22, wherein the projections substantially extend across an entire distance measured between the connecting openings and the recesses.

24. The link member according to claim 22, wherein the projections extend toward a plane defined by lateral surfaces of the at least one central stud.

* * * * *